United States Patent Office 3,405,176
Patented Oct. 8, 1968

3,405,176
BROMODICHLOROACETANILIDES
Basil S. Farah, Allentown, Pa., and Everett E. Gilbert, Morris Township, Morris County, N.J., assignors to Allied Chemical Corporation, New York, N.Y., a corporation of New York
No Drawing. Filed Nov. 6, 1964, Ser. No. 409,574
4 Claims. (Cl. 260—562)

ABSTRACT OF THE DISCLOSURE

The invention relates to bromodichloroacetanilides which have fungicidal and nematocidal activity.

---

This invention relates to new compounds with fungicidal and nematocidal activity. More particularly, this invention relates to new bromodichloroacetanilides and methods of producing same.

It has been found that novel compounds produced by heating aniline or a substituted aniline with 1,3-dibromotetrachloroacetone possess excellent fungicidal as well as nematocidal activity. It is therefore the primary object of this invention to produce compounds with both fungicidal as well as nematocidal properties. Another object of this invention is to provide a method for the production of these new compounds. Another object of this invention is to provide a composition of matter which possesses fungicidal as well as nematocidal properties. Another object of this invention is to provide new and novel compounds with fungicidal and nematocidal activity by reacting aniline or a substituted aniline with 1,3-dibromotetrachloroacetone, the preparation of which is fully described in copending U.S. application Ser. No. 354,793, by B. S. Farah et al., filed Mar. 25, 1964, now abandoned. These and other objects will become apparent in the following detailed description.

Generally the objects of this invention are achieved by mixing in the presence of any conventional organic solvent, such as methylene chloride, a reacting quantity of 1,3-dibromotetrachloroacetone with aniline or a substituted aniline, heating the mixture to about 41° C. for approximately one hour. The temperature may be higher and thus the time of heating shortened, or it may be lower as it is not of importance how long the heating of the mixture takes, only that a sufficient time elapse for the reaction to be complete. At this time the reaction products are separated and the novel compounds of this invention purified by any conventional separation and purification procedure. The novel compounds are generally washed with dilute aqueous HCl to remove any unreacted amine and recrystallized from ether-petroleum ether and dried.

More specifically 1,3-dibromotetrachloroacetone is reacted with an aniline of the general formula

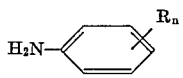

in which R is a member selected from the group consisting of chlorine, lower alkyls, for example up to 6 carbon atoms, and halogen substituted lower alkyls and $n$ is an integer of 0 to 2, in the presence of any conventional organic solvent such as methylene chloride, hexane, benzene or isopropyl ether. The new and novel compound is then separated from reaction products as well as the starting materials and dried. The compound is now in condition to be applied as a fungicide or a nematocide.

The novel fungicidal compounds may be applied to plants in a number of ways. For the preparation of a dusting powder, the compounds are finely divided and then intimately mixed with finely divided dry solid talc, clays such as attapulgite, kaolin or fuller's earth, wood flour or other conventional inert solid carriers of the type commonly employed in formulating fungicidal powder compositions. The concentration of the active compound to the inert carrier may vary from 1 percent by weight to 20 percent by weight, with the preferred concentration being 5 percent by weight to 10 percent by weight. Wettable formulations suitable for dispersing in water and applying the water dispersions to the plants, are prepared by incorporating in any of these dusting compounds small amounts of surface active materials, for example, about 1 percent to about 5 percent, by weight, which serve to maintain the finely powdered composition dispersed in water with which it is mixed. Suitable surface active materials are the anionic and nonionic, wetting dispersing and emulsifying agents conventionally employed in the formulation of wettable powder compositions, for example, the alkali metal and ammonium salts of long chain aliphatic carboxylic acids, sulfonates of the aromatic or long chain aliphatic hydrocarbons, such as sodium alkyl sulfates and sulfonates, alkyl aryl sulfonate salts, sulfonates of glycerides and their fatty acids and sulfonates of derivatives of fatty acid esters. In general it is preferred to employ the anionic surface active agents and to formulate these wettable powders containing the novel fungicidal compounds to include both wetting agent and dispersant or emulsifying agent, which is common practice in preparing formulations of powdered materials to be dusted onto or, dispersed in water, sprayed onto living plants.

Spray formulations can also be prepared by dissolving the fungicidal compounds in suitable organic solvents such as xylene and benzene and incorporating emulsifying agents with them. Concentrated solutions of the fungicidal compounds in such solvents may be prepared and dispersed in water to give an emulsion of suitable concentration of the fungicidal compounds for application to the plants. In general the aqueous dispersions which are applied to living plants will contain from about 0.125 lb. to about 1.5 lbs., preferably about 0.5 lb. to about 1.0 lb. of the fungicidal compound to every 100 gallons of water.

The novel nematocidal compounds may be applied in a number of ways as well. They may be applied as a solution or suspension in water in such manner as to effect distribution through the upper layers of the soil. Also, nematocidal finely divided powder may be thoroughly mixed with the soil, for example, up to 6 to 12 inches with ordinary farm machinery.

The compounds of this invention may be used not only in soil, but in any composition which will support the growth of organic plants. Obviously, this will cover hydroponics.

The following examples illustrate the invention but are not to be construed as limiting it in any manner whatsoever:

EXAMPLE 1

Twenty grams of aniline were mixed with 35 grams of 1,3-dibromotetrachloroacetone and 50 ml. of a solvent, methylene chloride, and heated at 41° C. on a steam bath for one hour. The solvent and dichlorobromomethane formed were removed in vacuo and the resulting product was washed with dilute aqueous HCl to remove unreacted amine and then recrystallized from ether-petroleum ether to yield 21 grams, 74 percent, of

bromodichloroacetanilide, M.P. 75°–90° C., theoretical carbon 33.92 percent, found, 36.8 percent; theoretical hydrogen 2.12 percent, found, 2.07 percent and theoretical nitrogen 4.95 percent, found, 4.97 percent.

EXAMPLE 2

Twenty grams of 3-trifluoromethylaniline were mixed with 35 grams of 1,3-dibromotetrachloroacetone and 50 ml. of a solvent, methylene chloride, and heated at 41° C. on a steam bath for one hour. The solvent and dichlorobromomethane formed were removed in vacuo and the resulting product was washed with dilute HCl to remove unreacted amine and then recrystallized from ether-petroleum ether to yield 22 grams, 63 percent, of

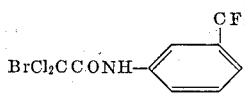

bromodichloroacet-3-trifluoromethyl anilide, M.P. 90°–93° C. The infrared spectrum of the new compound agreed with the assigned structure.

EXAMPLE 3

Twenty grams of 3-chloro-4-methylaniline were mixed with 35 grams of 1,3-dibromotetrachloroacetone and 50 ml. of a solvent, methylene chloride, and heated at 41° C. on a steam bath for one hour. The solvent and dichlorobromomethane formed were removed in vacuo and the resulting product was washed with dilute aqueous HCl to remove unreacted amine and then recrystallized from ether-petroleum ether to yield 19 grams, 54 percent, of

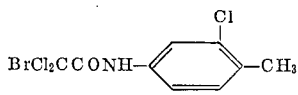

bromodichloroacet-3-chloro-4-methyl anilide, M.P. 143°–144° C., percent halogen as chlorine, theoretical 44.4 percent, found, 44.5 percent. The infrared spectrum of the new compound agreed with the assigned structure.

EXAMPLE 4

Twenty grams of 3,4-dichloroaniline were mixed with 35 grams 1,3-dibromotetrachloroacetone and 50 ml. of a solvent, methylene chloride, and heated at 41° C. on a steam bath for one hour. The solvent and dichlorobromomethane formed were removed in vacuo and the resulting product was washed with dilute aqueous HCl to remove unreacted amine and then recrystallized from ether-petroleum ether to yield 22 grams, 35 percent, of

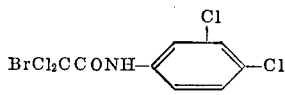

bromodichloroacet-3,4-dichloroanilide.

The novel compounds of this invention can be used successfully as both fungicides and nematocides. A standard method used to show the effectiveness of the compounds of this invention as a nematocide is essentially described by Schuldt & Bluestone in "Contributions from Boyce Thompson Institute," volume 19, page 65 (1957), using *Panagrellus redivivus*. The nematocide, bromodichloroacetanilide, was added to water to produce an aqueous solution of 100 p.p.m. and 50 p.p.m. The dilute nematocidal solution was added to a solution of the nematode, *Panagrellus redivivus*, and was checked for percentage kill for several days running. A control test solution without the nematocide was used as a check. After one day at 100 p.p.m. the percentage kill was 75 percent, and with the 50 p.p.m. solution there was a 20 percent kill. At the end of two days with the 100 p.p.m. solution there was a 100 percent kill and with the 50 p.p.m. solution there was a 25 percent kill. At the end of 7 days, with the 100 p.p.m. solution there was obviously a 100 percent kill and with the 50 p.p.m. solution there was a 90 percent kill.

With relation to the fungicidal activity of these novel compounds, they were first tested in a slide germination procedure. Two of these novel compounds, bromodichloroacetanilide, called Compound I in the table below, and bromodichloroacet-3,4-dichloroanilide, called Compound II in the table below, were screened by making an acetone solution of each one of them at a concentration of 100 p.p.m., 10 p.p.m. and 1 p.p.m. to which was then added test organisms *Sclerotinia fructicola* and *Stemphylium sarcinaeforme*. These combined solutions were incubated for 24 hours at 65° F. The depressed slides were then examined and the percentage of germination recorded. The table below shows the results of two novel compounds with the two test organisms:

TABLE 1

| Cpd. | Sclerotinia | | | Stemphylium | | |
|---|---|---|---|---|---|---|
| | 100 | 10 | 1 | 100 | 10 | 1 |
| I | 0 | 0 | 98 | 0 | 0 | 99 |
| II | 0 | 0 | 99 | 0 | 0 | 99 |
| Control | 98 | | | 98 | | |

In a preliminary greenhouse test, complete control of *Venturia inaequalis* (apple scab) using a wettable powder formulation of bromodichloroacetanilide and bromodichloroacet-3,4-dichloroanilide was obtained as there was no germination of the test organism on apple seedlings treated with the two compounds.

While in the foregoing specification there has been set forth specific embodiments of this invention for purpose of illustration, it will be apparent to those skilled in the art that many of the specific embodiments and details thereof can be varied widely without departing from the spirit and scope of this invention.

We claim:

1. The compound, of the formula which is

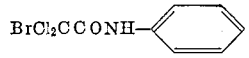

2. The compound, of the formula which is

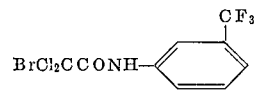

3. The compound, of the formula which is

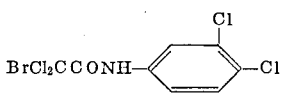

4. The compound, of the formula which is

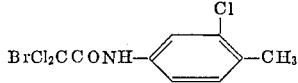

References Cited

FOREIGN PATENTS 578,434  6/1959  Canada.

OTHER REFERENCES

Clark et al.: Biochem. Jour., vol. 55, pp. 839–1 (1953).
Fukui et al.: Chem. Abst., vol. 54, cols. 4430–1 (1960).
Ozawa et al.: Jour. Pharm. Soc., Japan, vol. 73, pp. 719–21 (1953).

NORMA S. MILESTONE, *Primary Examiner.*

N. TROUSOF, *Assistant Examiner.*